Patented Mar. 19, 1940

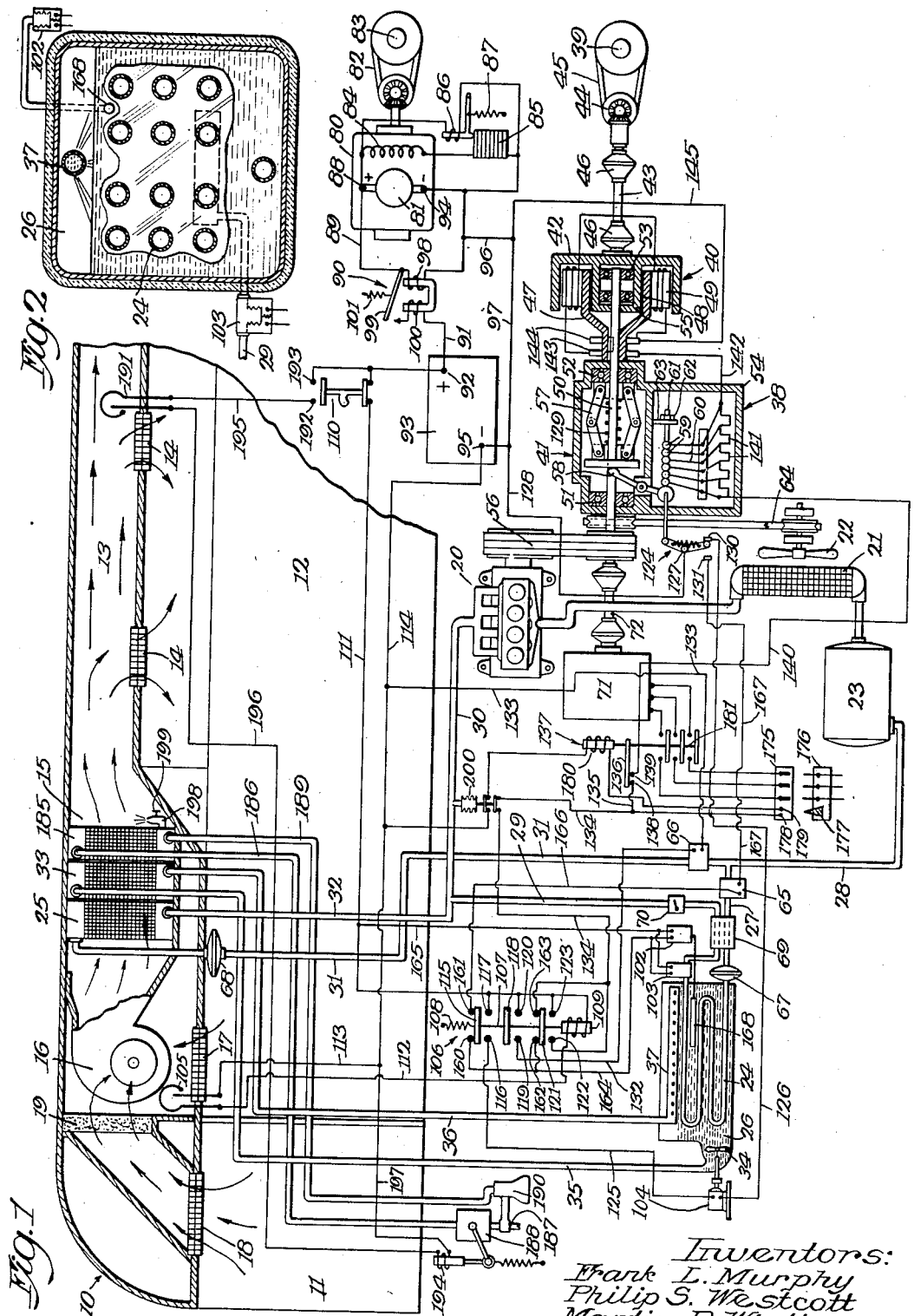

2,193,838

UNITED STATES PATENT OFFICE 2,193,838

AIR CONDITIONING SYSTEM FOR VEHICLES

Frank L. Murphy, Chicago, Philip S. Westcott, Oak Park, and Martin P. Winther, Waukegan, Ill., assignors to Pullman-Standard Car Manufacturing Company, Chicago, Ill., a corporation of Delaware Application August 30, 1935, Serial No. 38,502

9 Claims. (Cl. 62—6)

This invention relates to an air conditioning system for vehicles (particularly railway passenger cars) and among the primary objects of the invention are the following: to operate the air conditioning apparatus by a variable speed mechanism connected directly to one of the car axles; to employ an electro-magnetic clutch as an element of the variable speed mechanism and supply it with electrical energy from the conventional axle-generator-battery car lighting unit; to disassociate the drives for the generator and air conditioning apparatus so that the load is better distributed and failure of the air conditioning apparatus will not disturb the lighting equipment; to operate the controls for the air conditioning apparatus from the generator battery car lighting unit, the battery being amply sufficient for operating the control circuits in the event of generator failure; to drive the air conditioning apparatus by a standby motor at stations, and automatically open the circuit through the variable speed mechanism whenever the motor is energized; to build up reserve refrigeration capacity in the form of ice and to control the amount of ice that is formed by temperature and pressure responsive means; to automatically make use of the reserve refrigeration when the car speed is insufficient for operating the primary system of refrigeration; to close the feed line to the refrigerant evaporator in the brine tank as soon as the car speed drops below a predetermined minimum; and to simplify and render more efficient systems of air conditioning that are now commonly in use.

Further and other objects and advantages will become apparent as the disclosure proceeds and the description is read in conjunction with the accompanying drawing, in which Fig. 1 is a schematic layout of an air conditioning system embodying the principles of this invention; and Fig. 2 is a sectional view through the brine tank showing the temperature and pressure responsive devices for limiting the formation of ice in the tank.

The specific disclosure of an air conditioning system embodying the principles of this invention is for the purpose of complying with Section 4888 of the Revised Statutes, but it will be understood that the invention is not limited to the specific arrangement shown and described, and the appended claims are to be construed as broadly as the prior art will permit.

General organization

The air conditioning system is adapted to be used on various classes of vehicles, and the choice of a railway passenger car for illustrating an embodiment of the invention is for the most part arbitrary. There are, however, some problems in air conditioning railway passenger cars which make the system of this invention particularly suitable for application to this class of vehicles.

The system disclosed includes means for filtering, cooling, and dehumidifying the air in the summer time, and means for filtering, heating and humidifying the air in the winter time.

The cooling of the air is accomplished by a refrigerating system which is operated through a variable speed device from one of the car axles when the car is in motion, or by a standby motor when the car is at stations. The refrigerating system includes parallel evaporator circuits, one of which is adapted to cool the air that is being delivered to the car interior by direct expansion coils, and the other being adapted to store up refrigeration in the form of ice whenever car cooling is not required and there is power available for operating the refrigerating system.

Car heating is accomplished by a steam coil in the path of the air that is being delivered into the car interior. The steam coil may have a humidifier associated with it for delivering moisture to the air after it has passed through the coil.

Ventilation system

Referring now to Fig. 1, a fragment of a railway passenger car is indicated at 10 having a vestibule 11 and passenger space 12. An air duct 13 extends longitudinally of the car at roof level and has a plurality of openings 14 for distributing the conditioned air throughout the car interior.

Adjacent one end of the car, but still overhead, is an air conditioning chamber 15 in which the temperature changing coils and humidifier are placed. Air is delivered into this chamber by a blower 16 which is run from the car axle lighting system and which draws air through a grille 17 communicating with the car interior 12, and a grille 18 in the vestibule 11 in proportions which may be fixed, at will. The fresh air that is drawn in through the grille 18 in the vestibule 11 passes through a filter 19 before being delivered to the air conditioning chamber.

Refrigerating equipment

The refrigerating system includes a compressor 20, adapted to deliver hot gaseous refrigerant under pressure to a condenser 21 cooled by a fan 22, the rotational direction of which alternates with the direction of car movement, a receiver 23, in which the liquid refrigerant from the condenser 21 is stored, and parallel evaporators 24 and 25, the former being located within a brine tank 26, and the latter being located within the air conditioning chamber 15 in the path of the air to be conditioned. The evaporator 24 is connected by a branch feed 27 to the main feed line 28 and by a branch return 29 to the main return line 30. The evaporator 25, or primary coil is connected by a pipe 31 with the main feed line 28 and by a pipe 32 with the main return line 30. All of the refrigerating equipment with the exception of the primary coil 25 is preferably located beneath the car and the condenser is placed so that the natural draft caused by car movement is utilized as much as possible in condensing refrigerant from the compressor.

A brine or secondary coil 33 is located in the air conditioning chamber 15 adjacent to the primary coil 25 and is connected in a fluid circuit which includes the brine tank 26. A brine pump 34 is adapted to circulate brine through the secondary coil 33 and back again to the tank under predetermined conditions. The pipes leading from the brine tank to the secondary coil 33 are indicated at 35 and 36, the latter terminating in a header 37 for distributing the warm brine over the evaporator coil 24, as best shown in Fig. 2.

The compressor 20 is operated through a variable speed device 38 from a car axle 39. The variable speed device includes an electro-magnetic clutch 40 and a speed control governor, generally indicated at 41. The clutch 40 is composed of an armature 42 which is connected through a propeller shaft 43, jack shaft 44 and belt drive 45 with the axle 39, universal joints 46 being provided to accommodate relative movement between the jack shaft 44 which is mounted on the car truck and propeller shaft 43 which is supported from the car underframe.

A field spider 47 is rotatable within the armature 42 and has a bearing surface 48 for supporting the armature, and field coils 49 for transmitting torque between the armature 42 and spider 47 under predetermined conditions. The spider 47 is keyed to a main speed control shaft 50 which is supported by bearings 51, 52 and 53, the former two bearings being enclosed within a speed control housing 54 mounted on the car underframe, and the latter bearing 53 being located within the hub 55 of the armature. A belt drive 56 transmits power from the shaft 50 to the compressor.

The current through the field coils 49 is controlled by a fly ball governor 57 which acts through a pivoted arm 58 to change the contact pressure between silver contacts 59 mounted on springs 60 within the housing 54. The initial position of the silver contacts 59 is adjusted by means of a rod 61 and an adjusting nut 62, the latter bearing against a lug 63 formed on the speed control housing 54.

It will be observed that the direction of rotation of the shaft 50 depends upon the direction of car movement. The compressor 20 is constructed so that it operates with the same efficiency in either direction of rotation. The condenser fan 22 which is driven by a belt 64 from the shaft 50 alternates its direction of rotation with the direction of car movement, this being desirable since the fan acts merely to aid natural drafts in properly cooling the condenser.

Numerous valves are associated with the refrigerating system for effecting proper control of the system. The branch feed lines 27 and 31 leading to the evaporators 24 and 25, respectively, are controlled by solenoid valves 65 and 66, respectively. These same lines also have expansion valves 67 and 68, respectively, the former being set for a pressure of approximately 10 lbs. to keep the temperature of the evaporator 24 at approximately 0° F., and the latter being set at approximately 35–40 lbs. for effecting a temperature of approximately 40°–45° F., in the primary coil 25. At this temperature, the coil 25 will dehumidify the air that is being passed through the coil. The lower temperature of the coil 24 makes it desirable to employ a heat exchanger 69 between the return line 29 and the feed line 27.

A check valve 70 in the branch return line 29 associated with the brine tank evaporator 24 prevents liquid from condensing in the brine tank evaporator when the primary coil 25 is in operation.

An alternating current standby motor 71 (220 volts, or 440 volts) is provided for driving the compressor when the car is at stations, the drive being effected through a shaft 72 which in effect is a continuation of the speed control shaft 50.

*Control of refrigerating system*

All of the control circuits for the refrigerating equipment receive their electrical energy from the car axle-generator-battery lighting unit, and in the event of failure of the car lighting generator, the battery is sufficient to operate the control circuits until the car reaches its destination.

The car axle-generator-battery lighting unit consists of a generator 80, the armature 81 of which is driven through a belt drive 82 from a car axle 83, this axle being at the opposite end of the car from the axle 39. The field 84 of the generator is controlled by a generator regulator which includes a carbon pile 85 connected in series with the field, and a carbon pile control solenoid 86, the coil of which is connected across the armature terminals. A spring 87 applies a given pressure to the carbon pile 85 as long as no current flows through the coil of the solenoid 86. This pressure is gradually diminished as current flows through the coil of the solenoid 86. As pressure on the carbon pile 85 is reduced, less current flows through the field 84 and the output of the generator is thereby held at a substantially constant value.

The positive terminal 88 of the generator is connected through a conductor 89, battery cut-in switch 90 and conductor 91 with the positive terminal 92 of a battery 93 and the negative terminal 94 of the generator is connected to the negative terminal 95 of the battery through conductors 96 and 97.

The battery cut-in switch 90 closes the connection between the positive terminals of the generator and battery as soon as the voltage across the positive and negative terminals of the generator is sufficient to cause the coil 98 of the battery cut-in switch to pull down the armature 99. As soon as this has been accomplished, a holding coil 100 keeps the armature down until the voltage across the generator is insufficient to resist the tension of the spring 101, whereupon the generator and battery are disconnected.

The generator 80 is equipped with a pole changer for preserving the polarity of the generator irrespective of the direction of car movement. A description of the pole changer may be found in Car Builder's Cyclopedia, 1931 (published by Simmons-Boardman Publishing Company) at pages 678 and 679.

The battery 93 may be of standard size and capacity which is generally 450–600 ampere-hour capacity.

In the particular embodiment of the invention herein shown and described, the primary coil 25 is maintained in operation as long as car cooling is required, and thereafter, if the compressor is still in operation, the refrigeration load is transferred to the evaporator coil 24 in the brine tank 26. After a sufficient amount of ice has been built up in the brine tank, as determined by a submerged thermostat 102 and a pressure responsive device 103, the compressor is shut off.

The brine pump 34, which is rotated by a motor 104, is operated automatically as soon as the car speed falls below a predetermined minimum. In the particular system shown in the drawing, the starting of the brine pump automatically stops the primary system of refrigeration which includes circulation of refrigerant through the primary coil 25. This, however, is optional for by very slight modification of the system shown in the drawing, it is possible to have the brine pump circulate cold brine at low car speeds to assist the primary system which, at low car speed, is operating at fractional capacity.

A cooling thermostat 105 located adjacent to the re-circulated air intake 17 controls the position of a cooling relay, generally designated 106, the armature 107 of which is normally held in its raised position by a spring 108, but which is lowered by a coil 109 whenever the circuit through the cooling thermostat 105 is closed. The circuit for lowering the armature 107 may be traced from the positive terminal 92 of the battery through a manual switch 110 (which selects whether the heating system or the cooling system is in operation), conductor 111, coil 109, conductor 112, thermostat 105, conductor 113, and back to the negative terminal 95 of the battery through conductor 114.

Let us first assume that car cooling is called for, and that the armature 107 is in its lowered position. Under these conditions, the arm 115 of the cooling relay will bridge contacts 116 and 117, the arm 118 will bridge contacts 119 and 120, and the arm 121 will bridge contacts 122 and 123.

It will be noted that contacts 117, 120, and 123 are all connected to the positive side of the battery 93 through the conductor 111. The bridging of contact 117 with contact 116, therefore, closes one side of the circuit through the brine pump motor 104 and makes its operation subject to the action of the speed control brine switch, generally designated 124, as will be seen by tracing this circuit from the contact 116 through conductor 125, motor 104, conductor 126 to the speed control switch 124. This switch operates with a snap action and has its arm 127 connected by a conductor 128 to the negative terminal 95 of the battery 93. When the speed of the car has been reduced to such an extent that the fly ball governor 57 has been forced by the action of spring 129 to the position shown in the drawing so that the switch arm 127 is in engagement with the contact 130, the brine pump motor 104 is energized, and cold brine is circulated through the secondary coil 33 for cooling the air within the car.

If, however, the car speed is such that the fly ball governor has caused the arm 58 to throw the switch 124 so that the switch arm 127 is in engagement with the contact 131, the circuit through the brine pump motor 104 is open and the primary system of refrigeration is in operation.

Assuming this last condition and that the thermostat 105 still calls for air cooling, the bridging of contacts 120 and 119 closes the circuit through the solenoid valve 66 in the branch feed line 31 leading to the primary coil 25, as will be seen by tracing the circuit from the contact 120 through contact 119, conductor 132, solenoid valve 66, conductor 133, and conductor 114 back to the negative side of the battery. The energization of solenoid valve 66 opens the branch feed line 31 and permits refrigerant to be expanded in the coil 25, thus cooling the car.

The closing of thermostat 105 and the consequent energization of the coil 109 also has the effect of energizing the speed control mechanism 38 and operating the compressor 20 by power taken from the car axle 39. The circuit may be traced from contact 123 (which, like contacts 120 and 117, is connected directly to the positive side of a battery 93) through the arm 121 attached to the armature 107, contact 122, conductor 134, conductor 135, switch blade 136 of the alternating current switch generally designated 137 (the switch arm 136 closes the contacts 138 and 139 except when the alternating current motor 71 is in operation) conductor 140 through one or more of the resistances 141 (the number of resistances in the circuit being dependent upon the position of the fly ball governor 57), conductor 142, slip ring 143 on the field spider 47, field coils 49, slip ring 144 and back to the negative side of the battery through conductors 145 and 97.

The action of the speed control device in regulating the amount of current flow through the field coils 49 is fully explained in the patent to Anthony Winther No. 1,982,461, issued November 27, 1934, and reference is made to that patent for more specific disclosure of this apparatus and its method of functioning.

Thus far, we have assumed that the car thermostat 105 calls for cooling. Now let us assume that no further cooling is needed within the car. Under these circumstances, the coil 109 is de-energized and the spring 108 of the cooling relay has pulled the armature 107 to the position shown in Fig. 1 of the drawing. In this position, the arm 115 of the armature bridges contacts 160 and 161, and the arm 121 bridges the contacts 162 and 163. Contacts 160 and 162 are connected through a conductor 164, the pressure responsive device 103, thermostat 102 (the pressure responsive device 103 and the thermostat 102 being connected in parallel) conductor 165 and conductor 111 to the positive side of the battery 93.

The bridging of contacts 160 and 161 therefor closes the circuit through the solenoid valve 65 in the branch feed line 27 leading to the brine tank evaporator 24, unless both the pressure responsive device 103 and the ice thermostat 102 have opened their respective circuits and unless the speed of the car is such that the switch arm 127 has been snapped to the position shown in the drawing, i. e. in contact with contact 130. This means that the flow of refrigerant to the brine tank evaporator 24 is stopped either when sufficient ice has been formed (as determined by the pressure device 103 and thermostat 102), or when the car is travelling at such a low speed that the refrigerant compressor has not sufficient capacity to do any useful work in building up ice within the brine tank 26. The circuit can be traced from the contact 160 through the arm 115, contact 161, conductor 166, solenoid valve 65, conductor 167, contact 131, switch arm 127 and back to the negative side of the battery through conductor 128.

The bridging of contacts 162 and 163 by the arm 121 closes the circuit through the speed control mechanism and thus operates the compressor from the car axle 39, but it will be understood that the energization of the speed control mechanism in this case is subject to the action of the pressure responsive device 103 and thermostat 102 associated with the brine tank evaporator 24 since these two devices are connected in series with the contacts 162 and 163.

The check valve 70 prevents the refrigerant from condensing in the brine tank evaporator 24 when the primary coil 25 is in operation. This is necessary because the two coils are being operated at different suction pressures.

At stations where three phase alternating current is available, a connection is made at the receptacle 175 with the A. C. source, the plug 176 having a contactor 177 for bridging the contacts 178 and 179 in the receptacle and thus completing the direct current circuit through the coil 180 of the alternating current switch 137, provided the thermostat 105 has lowered the armature 107 of the cooling relay to bridge the contacts 122 and 123. The contacts for the three phase current are arranged in the receptacle so that they connect with the alternating current source before the conductor 177 bridges the contacts 178 and 179, so that the closing of the circuit for the energization of the alternating current motor 71 takes place in the alternating current switch 137 where the contacts are suitably constructed for taking the load. It will be observed that when the coil 180 is energized, the arm 136 of the armature 181 breaks the circuit between contacts 138 and 139 before the A. C. motor circuit is completed which means that the field coils 49 of the speed control mechanism 38 are deenergized and, therefore, cause no drag as the shaft 50 is rotated by the motor 71.

The control of the refrigerating system by the cooling relay 106 is the same when the alternating current motor 71 is in operation as when the compressor is powered through the speed control device 38. The primary coil 25 is supplied with refrigerant as long as car cooling is required and, thereafter, the compressor capacity is utilized for building up ice in the brine tank 26 until the pressure responsive device 103 and ice thermostat 102 open the circuit through the coil 180 and thus stop the alternating current motor 71.

A low pressure safety switch 200 is associated with the main suction line 30 leading to the compressor and its function is to shut off the compressor when the pressure in the suction line drops below a predetermined minimum. The switch has two sets of contacts, one set being interposed in the series with the A.-C. switch coil 180 so as to open the A.-C. switch in case the compressor is being driven by the motor 71, and the other set is interposed in the conductor 134 to open the circuit through the speed control device 40 in case the compressor is being driven from the car axle.

*Summary of cooling system*

A. When the car is travelling above a predetermined minimum speed and the cooling thermostat 105 calls for cooling, the following takes place:

1. The brine pump 34 is placed in readiness for operation whenever the car speed falls below the predetermined minimum speed. (The switching on of the brine pump may be concurrent with the shutting off of the compressor due to low car speed, as shown in the drawing, or there may be an overlap.)

2. The solenoid valve 66 which controls the flow of refrigerant to the primary coil 25 in the air conditioning chamber 15 is energized, thus allowing refrigerant to flow to the coil and cool the air that is being delivered into the car.

3. The speed control circuit is energized so that torque is transmitted from one of the car axles through the speed control mechanism to the compressor for operating the refrigerating system.

B. When the cooling thermostat 105 does not call for car cooling (the car still travelling above the predetermined minimum speed), the following action takes place:

1. The solenoid valve 65 which controls the flow of refrigerant to the brine tank evaporator 24 is energized, thus allowing refrigerant to flow to this evaporator (solenoid valve 66 being deenergized and, therefore, closed), but (a) If sufficient ice has been formed to encase the bulb 168 of the ice thermostat, (see Fig. 2) there will be a quick drop in temperature which will actuate the ice thermostat 102 and open the shunt circuit which is controlled by it, but the compressor is not shut off until the pressure responsive device 103 has also been actuated to open its shunt circuit.

(b) If the pressure in the evaporator coil 24 falls below a predetermined minimum, it will actuate the pressure responsive device 103 and open the shunt circuit which it controls, but the compressor is not shut off unless the thermostat 102 has indicated that ice has formed about the bulb 168.

The combination of temperature and pressure control of the ice formation in the brine tank is exceedingly desirable because neither one alone is capable of effecting the proper control. As it is, when the ice formation reaches a predetermined amount the pressure in the suction line drops sufficiently to actuate the pressure responsive device 103 and shut off the compressor. (The pressure responsive device is set so that the ice thermostat will also open its branch of the circuit before the pressure responsive device operates to open the circuit.)

As soon as the compressor stops, the pressure in the brine evaporator coil 24 rises to a pressure which corresponds to the temperature of the ice in the tank and so obviously the cut-in pressure of the pressure responsive device 103 must be above this value. Unfortunately, however, if the cut-in pressure is but slightly higher than the balancing pressure, the compressor will cycle too frequently for efficient operation and if the cut-in pressure is substantially higher than the balancing pressure almost all of the ice in the tank will be melted before the compressor again begins to build up more ice.

The ice thermostat on the other hand, is capable of starting the compressor at the proper time because it, in effect, measures the extent of the ice formation. When brine is being circulated through the coil 33, the warm brine entering the tank through the spray pipe 37 melts the upper layer of ice and as soon as sufficient ice has been melted to uncover the thermostat bulb 168, the thermostat 102 operates to close the circuit through the compressor and again begin the manufacture of ice.

The ice thermostat is not capable in itself of effecting the complete control (without the pressure responsive device 103) because if the thermostat is located in a position such as shown in Fig. 2, the compressor will go on and off too frequently for efficient operation of the system.

The operation of the ice thermostat 102 and the pressure responsive device 103 may, therefore, be summarized as follows:

Assuming a full tank of ice, the first thing that happens when the ice begins to melt in any substantial amount is that the ice thermostat bulb 168 is uncovered, thus closing the circuit through the thermostat 102 and opening the refrigerant valve 65. The onrush of refrigerant into the coil 24 raises the pressure within the coil a sufficient amount to close the circuit through the pressure responsive device 103 (this is not necessary for having the compressor operate). The formation of ice continues until the pressure in the coil drops to the cut-out pressure of the pressure responsive device 103 and then the compressor is shut off.

Stated in other words, the ice thermostat 102 serves to start the compressor whenever a portion of the ice has been melted at the top of the tank and requires replenishing and the pressure responsive device 103 serves to stop the compressor when the desired amount of the ice has been formed.

2. The speed control circuit is energized to run the compressor by power taken from the car axle, but this circuit also is subject to the conditions (a) and (b) above. In other words, as long as car cooling is not required, and there is sufficient refrigerant capacity to do useful work, and provided further that the reserve refrigeration in the brine tank 26 is below a predetermined amount, refrigerant will flow to the evaporator 24, but when sufficient ice has been formed as determined by both the surface condition and average condition, the flow of refrigerant to the brine tank evaporator 24 will be stopped, and the speed control circuit de-energized.

C. When the car is travelling below the predetermined minimum speed and the car thermostat 105 calls for cooling, the brine pump 34 is started and car cooling is effected by the secondary coil 33. At the same time, solenoid valves 65 and 66 are de-energized and hence closed, thus shutting off the supply of refrigerant to both coils (24 and 25).

D. When the car is travelling at a speed so slow that the snap switch 124 is in the position shown in Fig. 1 and at the same time the car thermostat 105 does not call for cooling, the entire refrigeration system is inactive.

E. When the car is at stations where there is an alternating current source of electrical energy and the car thermostat 105 calls for cooling, the control of the refrigeration system is the same as described under point A of this summary, with the exception that the coil 180 of the A. C. switch 137 is energized instead of the speed control mechanism.

F. When the car is at stations where there is an alternating current source of electrical energy available and the car thermostat 105 does not call for car cooling, the control of the refrigeration system is the same as described under point B of this summary with the exception that the shutting off of the compressor when sufficient ice has been formed in the brine tank is effected by de-energizing the coil 180 of the A. C. switch 137 instead of opening the circuit through the speed control mechanism.

*Heating and humidifying equipment with controls*

The heating equipment comprises a steam coil 185 in the air conditioning chamber 15, connected by a pipe 186 with the main steam line 187 through a solenoid operated valve 188 and by a pipe 189 with a vapor regulator 190.

The heating system is made subject to the action of heating thermostat 191 by manually throwing the switch 110 so as to bridge contacts 192 and 193 which places the heating thermostat 191 in series with the coil 194 of the solenoid valve 188, and the battery. Thus, whenever car heating is required, the circuit through the coil 194 is closed and steam is admitted to the coil 185. The electrical circuit can be traced from the positive terminal 92 of the battery through conductor 195, heating thermostat 191, conductor 196, coil 194, conductor 197 and back to the negative terminal 95 of the battery through conductor 114.

Whenever the heating coil is in operation, a bleeder 198 supplies a limited amount of steam to the air to increase the moisture content of the air. The amount of moisture that is admitted to the air may be controlled by the valve 199.

In the appended claims, the expression "mechanical drive" (or similar expression) as applied to the drive for the compressor is used in the sense that the energy of the rotating axle is employed directly in driving the compressor, even though the torque is transmitted through an electro-induction clutch. This is in contradistinction to the conversion of the mechanical energy of the rotating axle into electrical power for operating a motor to drive the compressor.

We claim:

1. In an air conditioning system for vehicles, a primary system of refrigeration including a compressor driven by power taken from a rotating part on the vehicle, a variable speed device for maintaining the speed of the compressor constant irrespective of car speed, and a primary evaporating coil in the path of air to be conditioned, a secondary system of refrigeration including the same compressor, a brine tank, an evaporator coil in the brine tank receiving refrigerant from the compressor, and a secondary coil in the path of the air to be conditioned connected in a fluid circuit with the brine tank, a fluid pump in the brine circuit, and means associated with the variable speed device for energizing the fluid pump whenever the car speed falls below a predetermined minimum.

2. In an air conditioning system for vehicles, a primary system of refrigeration including a compressor driven by power taken from a rotating part on the vehicle, a variable speed device for maintaining the speed of the compressor constant irrespective of car speed, and a primary evaporating coil in the path of air to be conditioned, a secondary system of refrigeration including the same compressor, a brine tank, an evaporator coil in the brine tank receiving refrigerant from the compressor, and a secondary coil in the path of the air to be conditioned connected in a fluid circuit with the brine tank, a fluid pump in the brine circuit, a switch for energizing the fluid pump, and a mechanical governor for actuating the switch when the car speed falls below a predetermined minimum.

3. In an air conditioning system for railway cars, a refrigerant compressor, primary drive mechanism for the compressor including a car axle and a variable speed device, the latter having an electro-induction clutch adapted to automatically change the ratio between the axle rotation and compressor rotation in accordance with car speed, a standby motor for operating the compressor at stations from an external source of electrical energy, and means for preventing torque from being transmitted from the motor to the car axle when the motor is driving the compressor, said means including a solenoid switch having an armature which, when moved by the switch coil, operates to positively open the circuit through the electro-induction clutch and subsequently to close the electrical circuit from the external source of power to the standby motor.

4. In an air conditioning system for enclosures, an evaporator coil, a brine tank, a second evaporator coil in the brine tank connected in parallel with the first evaporator coil, means for supplying volatile refrigerant to both coils, solenoid valves controlling the admission of refrigerant to said coils, a relay operating in response to the temperature within the enclosure for selectively distributing the refrigerant to the coils, and a pressure check valve in the low pressure side of the second evaporator coil only and arranged to prevent the passage of refrigerant from the first evaporator to the second evaporator.

5. In an air conditioning system for a railway car, a compressor driven mechanically from one of the car axles, an evaporator coil, a brine tank, a second evaporator coil in the brine tank connected in parallel with the first evaporator coil, a source of electrical energy on the car, a solenoid valve associated with each coil and operated from said source for controlling the flow of refrigerant from the compressor to the coils, and means associated with the compressor drive for closing the brine evaporator valve whenever the speed of the car falls below a predetermined minimum.

6. In an air conditioning system for vehicles, a refrigerant liquefying unit, heat exchange means in the path of air to be conditioned including an evaporator adapted to receive refrigerant from the unit, a second evaporator adapted to receive refrigerant from the unit, a refrigerant holdover system including a holdover fluid adapted to be circulated in heat exchange relationship with the second evaporator and the heat exchange means, means furnishing energy for the unit including a standby motor and an axle drive, a clutch in the axle drive, automatic means for opening the clutch whenever the standby motor is operating, control means for circulating the holdover fluid through the heat exchange means when the vehicle speed is below a predetermined minimum and the motor is de-energized, and for stopping the circulation of fluid when the vehicle speed is above the predetermined minimum, or when the motor is energized, and thermostatic means for modifying the action of the control means in accordance with temperature conditions.

7. In an air conditioning system for a vehicle, a refrigerant liquefying unit, heat exchange means in the path of air to be conditioned including an evaporator adapted to receive refrigerant from the unit, a second evaporator adapted to receive refrigerant from the unit, a refrigerant holdover system including a holdover fluid adapted to be circulated in heat exchange relationship with the second evaporator and the heat exchange means, means furnishing energy for the unit including a standby motor and an axle drive, a clutch in the axle drive, means for disengaging the clutch in response to operation of the standby motor, and means for circulating the holdover fluid through the heat exchange means in response to a reduction of the vehicle speed below a predetermined minimum and the deenergization of the standby motor, and for stopping the circulation of the fluid in response to a rise in the vehicle speed above the predetermined minimum or in response to the energization of the standby motor.

8. In an air conditioning system for a vehicle, heat exchange apparatus including an air cooler and a holdover cooler, a refrigerant liquefying unit including a condenser, energy sources for operating the unit comprising a direct drive associated with a rotating part of the vehicle, a standby motor, and a battery, means enabling the direct drive or the standby motor to store refrigerant energy through operation of the holdover cooler, and means including the battery for transferring the stored refrigerant energy to the air cooler when the direct drive and standby motor are not available for supplying refrigeration.

9. In an air conditioning system for a vehicle, a refrigerant liquefying unit, heat exchange means in the path of air to be conditioned including an evaporator adapted to receive refrigerant from the unit, a second evaporator adapted to receive refrigerant from the unit, a refrigerant holdover system including a holdover fluid adapted to be circulated in heat exchange relationship with the second evaporator and the heat exchange means, means furnishing energy for the unit including a standby motor and an axle drive, a clutch in the axle drive, means for disengaging the clutch in response to operation of the standby motor, means for circulating the holdover fluid through the heat exchange means in response to a reduction of the vehicle speed below a predetermined minimum and the deenergization of the standby motor, and for stopping the circulation of the fluid in response to a rise in the vehicle speed above the predetermined minimum or in response to the energization of the standby motor, and thermostatic means for controlling the action of the heat exchange means in accordance with temperature conditions of the air to be conditioned.

FRANK L. MURPHY.
PHILIP S. WESTCOTT.
MARTIN P. WINTHER.